United States Patent [19]
Greene

[11] Patent Number: 6,130,754
[45] Date of Patent: Oct. 10, 2000

[54] EYESAFE TRANSMISSION OF HAZARDOUS LASER BEAMS

[75] Inventor: Benny Allan Greene, Australian Capital Territory, Australia

[73] Assignee: Electro Optic Systems Pty. Limited, Australia

[21] Appl. No.: 09/077,725

[22] PCT Filed: Dec. 6, 1996

[86] PCT No.: PCT/AU96/00795

§ 371 Date: Aug. 10, 1998

§ 102(e) Date: Aug. 10, 1998

[87] PCT Pub. No.: WO97/21261

PCT Pub. Date: Jun. 12, 1997

[30] Foreign Application Priority Data

Dec. 7, 1995 [AU] Australia ............................... PN 7027

[51] Int. Cl.[7] .................................................. G01N 21/55
[52] U.S. Cl. .......................... 356/445; 356/445; 356/446; 356/447; 356/448; 250/221; 250/222.1; 250/205; 359/589; 385/126; 385/127
[58] Field of Search ...................................... 356/445, 447, 356/448, 446; 250/221, 222.1, 121.83, 205; 359/589; 385/126, 127

[56] References Cited

U.S. PATENT DOCUMENTS 5,091,627  2/1992  Kimura ............................... 219/121.83
5,837,996  11/1998 Keydar .................................... 250/221

*Primary Examiner*—Frank G. Font
*Assistant Examiner*—Delma R. Flores Ruiz
*Attorney, Agent, or Firm*—Knobbe, Martens, Olson & Bear, LLP

[57] ABSTRACT

An apparatus and method for transmitting a hazardous electromagnetic beam (10). A hazardous beam (10) and a non-hazardous beam (12) are generated and directed along respective paths which are substantially parallel and either at least partially coincident or in close proximity so that an object will traverse the path of the non-hazardous beam (12) immediately before it is impinged by the hazardous beam (10). Any disturbance of the non-hazardous beam (12) by an object is detected and the hazardous beam (10) is disabled in response to a predetermined disturbance.

28 Claims, 2 Drawing Sheets

EYESAFE TRANSMISSION OF HAZARDOUS LASER BEAMS

FIELD OF THE INVENTION

This invention relates to the transmission of a hazardous electromagnetic beam and the particular though certainly not exclusive application to the transmission of a hazardous laser beam, for example a non-eyesafe laser beam.

BACKGROUND ART

It is often necessary or desirable to transmit a continuous wave (CW) or pulsed laser beam through a space which, though not continuously occupied by humans, is used or traversed by humans. If the laser beam exceeds safe levels for human exposure, to the eye or other organs, then the transmission introduces a serious hazard to the space which may cause injury to any person who inadvertently crosses the path of the beam. Similar considerations apply to other objects, eg: animals for which the beam may be hazardous.

One approach to this problem in the past has been to avoid the hazard at source, that is by adopting eyesafe lasers for the specific application. This was achieved by maintaining energy/power output at safe levels, or through the use of eyesafe wavelengths, eg: 1.5 to 1.6 $\mu$m. Where this approach was not satisfactory, it has been known to employ co-aligned radar systems which detect humans and other objects in the ray path and disable the transmission upon detection.

DISCLOSURE OF THE INVENTION

In many circumstances, it is not possible to use these techniques, and it is therefore an object of the invention to provide an alternative technique for the safe transmission of hazardous electromagnetic beams.

The present invention is based on the concept of providing a cladding or barrier beam of non-hazardous radiation which is employed to detect objects before they can penetrate to the hazardous beam. In a preferred arrangement, non-hazardous radiation wholly surrounds and clads the hazardous beam which then becomes a protected core within or at the centre of the cladding radiation.

The invention accordingly provides, in a first aspect, apparatus for transmitting a hazardous electromagnetic beam comprising a means to generate said hazardous beam and a non-hazardous electromatic beam; means to direct each of said beams along respective paths which are substantially parallel and either at least partially co-incident or in close proximity so that an object will traverse the path of the non-hazardous beam immediately before it is impinged by the hazardous beam; and means to detect disturbance of non-hazardous beam by an object and disable transmission of said hazardous beam in response to a predetermined disturbance of said non-hazardous beam so as to eliminate or substantially reduce the hazard posed by said hazardous beam.

In a further aspect, the invention provides a method of transmitting a hazardous electromagnetic beam comprising the steps of generating said hazardous beam and a non-hazardous electromagnetic beam; directing said beams along respective predetermined paths which are substantially parallel and either at least partially co-incident or in close proximity so that an object will traverse the path of the non-hazardous beam immediately before it is impinged by the hazardous beam; and detecting disturbance of the non-hazardous beam by an object, and in response to a predetermined disturbance of the non-hazardous beam disabling transmission of said hazardous beam.

In a particular application, the hazardous electromagnetic beam is a laser beam, eg: a continuous wave or pulsed laser beam. The non-hazardous electromagnetic beam is then preferably also a laser beam, most preferably a pulsed laser beam.

In one embodiment, the path of the non-hazardous beam includes a segment which in cross-section is adjacent to the path of the hazardous beam. In a particularly preferred embodiment, this segment wholly surrounds and thereby clads the path of the hazardous beam. In this arrangement, the path of the hazardous beam is effectively a core coaxial with or within the path of the non-hazardous beam.

In another embodiment, the paths of the hazardous and non-hazardous beam are at least partially coincident but the hazardous beam is pulsed so that detected disturbance of the non-hazardous beam may occur in the path of the hazardous beam but between pulses.

The means to generate the hazardous and non-hazardous beams may comprise separate laser emitting sources. Alternatively, there may be one laser source emitting, eg: the hazardous beam, and means such as a parametric conversion device for receiving a portion of this transmission and responding by emitting the non-hazardous beam, eg: a laser beam at a wavelength in the range 1.5 to 1.8 $\mu$m, preferably in the range 1.5 to 1.6 $\mu$m, eg: 1.54 $\mu$m.

It will be understood that the non-hazardous beam would have parameters eg: a repetition rate or pulse frequency and/or a cross-section selected for a particular application to match the expected time for an object, eg: a person or animal, to traverse the path of the non-hazardous beam, before it is impinged by the hazardous beam, while causing the detectable predetermined disturbance to the non-hazardous beam.

BRIEF DESCRIPTION OF THE DRAWINGS

The invention will be further described, by way of example only, with reference to the accompanying drawings, in which.

BEST MODE FOR CARRYING OUT THE INVENTION

Figure 1:
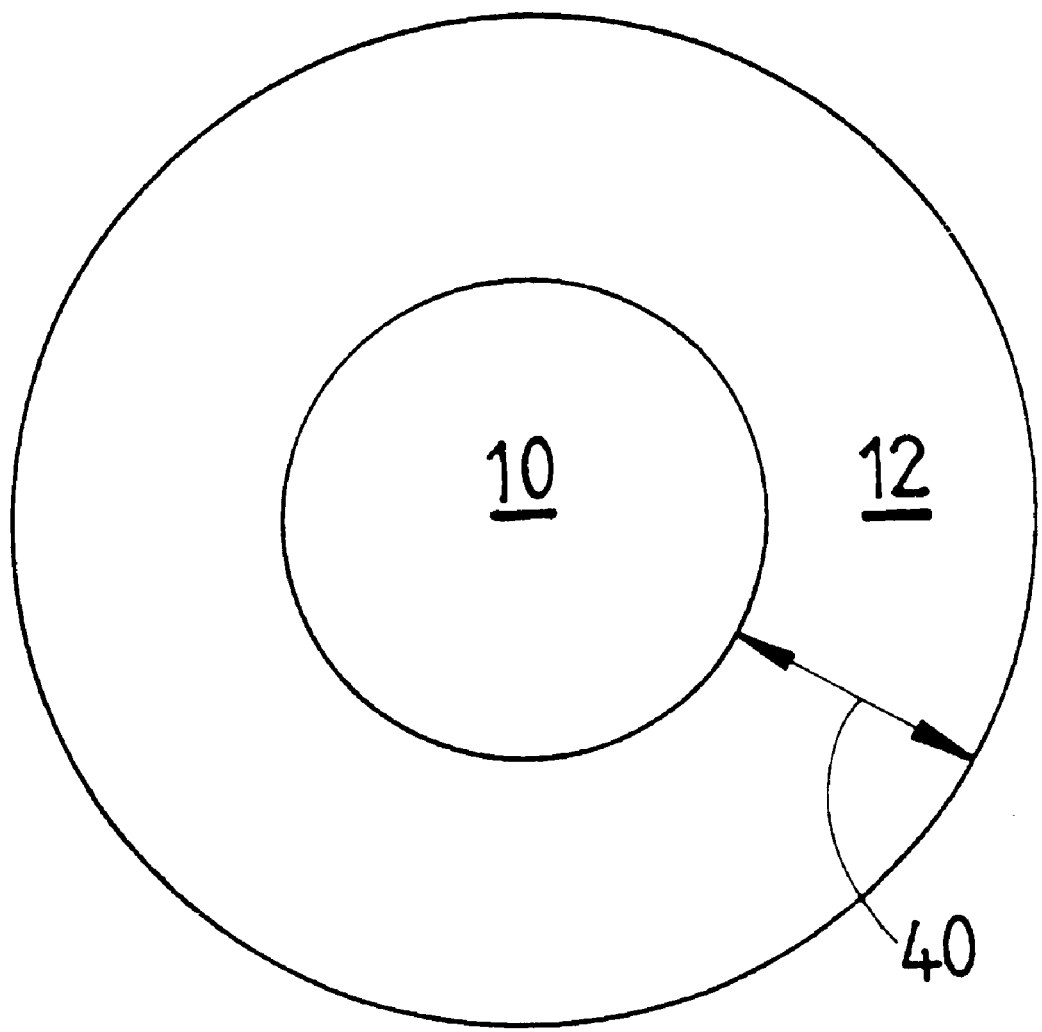
FIG. 1 is a diagram of a preferred cross-section of a beam configuration in which an eyesafe beam wholly clads a core comprising a hazardous beam.

FIG. 1 depicts a simple but preferred beam configuration produced by apparatus in accordance with an embodiment of the invention. A composite electromagnetic beam 5 includes a relatively smaller cross-section laser beam 10, which is hazardous to the extent that it is non-eyesafe in relation to wavelength and power, directed coaxially with a substantially broader laser beam 12 comprising of eyesafe laser radiation, eg: of 1.54 micron. The eyesafe beam is thus directed along a path that includes a segment of annular cross-section which wholly clads the non-eyesafe beam 10 at its core. The path of eyesafe beam 12, which may be referred to as a cladding beam, may either be coaxial with the non-eyesafe beam so that the latter is coincident with a core portion of the former, or they may be substantially distinct in space, or to intermediate these conditions, ie: with some overlap.

Figure 2:
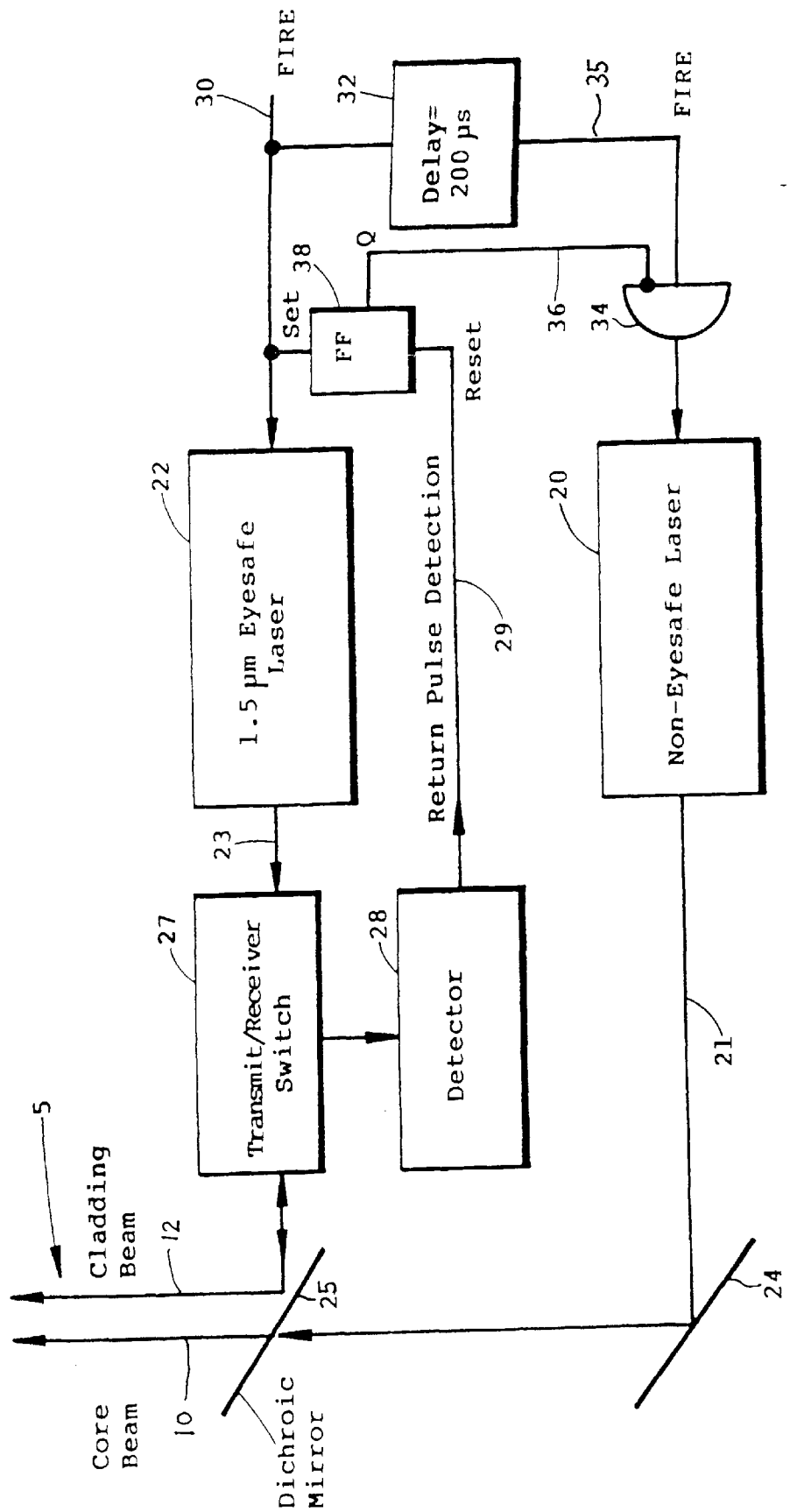
FIG. 2 is a simple block diagram of laser transmission apparatus in accordance with an embodiment of the invention.

FIG. 2 depicts an optical arrangement for generating the composite beam of FIG. 1. Respective laser sources 20, 22 generate non-eyesafe and eyesafe beams 21,23. The former may, for example, be an Nd:YAG laser emitting at 1.06 $\mu$m and the latter an erbium doped glass laser emitting a pulsed output at 1.54 $\mu$m. These beams are merged to form a composite beam 5 of the configuration shown in FIG. 1 by means of a simple reflecting mirror 24 for beam 21 and a dicroic mirror 26 for transmitting beam 21 and reflecting beam 23.

Detection of a disturbance of cladding beam 12 in this case is by return of a reflected or scattered signal via mirror 26 and a transmit/receive direction switch 27 to a suitable optical detector 28. At a given or predetermined level of detected disturbance, detector 28 responds by outputting an electrical trigger pulse on line 29. A common electrical fire signal for the lasers on line 30 is divided for non-eyesafe laser 20 into a first component on line 35 which is delayed by a 200 microsecond delay 32 and a second component directed via flip flop 38 on line 36. The two components are merged at AND gate 34, and non-eyesafe laser 20 is disabled when a trigger pulse on detector output line 29 resets flip flop 38 and thereby sets AND gate 34 to a non-fire condition.

It will be appreciated that the configuration of FIG. 2 entails single-ended monitoring. The principle of the invention does of course extend to double-ended optical links, in which the cladding beam is monitored at the receiving end of the link. In this case, CW cladding beams can be used.

A number of examples of the application of the invention to particular situations, and of the consequent selection of the parameters of the cladding beam, will now be outlined. These examples utilise an optical arrangement similar to FIG. 2 and a beam configuration of the form shown in FIG. 1. The determinations of parameters rely on conventional lidar equations for a cladding laser wavelength of 1.54 micron. It will of course be appreciated that any eyesafe pulsed laser will suffice, including lasers in the broad eyesafe wavelength range 1.5 to 1.8 micron, or a low-energy laser pulses outside this wavelength band.

EXAMPLE 1

Office or Factory Area with CW Laser Transmission (a) Human speed=10 m/sec (max)
(b) Cladding radial thickness=0.1 m (parameter 40 in FIG. 1)
(c) Required repetition rate=100 Hz (from a÷b)
(d) Length of line=200 m
(e) Energy of cladding pulse=1 mJ (from Lidar equation)

Thus a non-eyesafe beam could be rendered eyesafe by a 100 Hz/1 mJ cladding system. This system would detect 100 mm size targets at up to 200 m with 99.999% probability, or $10^{-5}$ probability of failure (PF). The detection of disturbance to the non-hazardous beam is used to disable the core laser safely, before penetration of its beam by the detected object, ie: before the object laterally traverses the 0.1 m lateral thickness of the cladding beam.

For a 5 m/s human speed (normal running), the probability of failure (PF) is $10^{-10}$, as two consecutive pulses must fail to detect the human. If the cladding beam was raised to 500 Hz, the PF falls to $10^{-25}$ for a 10 m/s "target".

EXAMPLE 2

Airspace with CW Laser Transmission
(a) Aircraft speed=250 m/s (jet aircraft)
(b) Cladding radial thickness=0.25 m
(c) Required repetition rate=1 KHz
(d) Length of link=30 km (slant path through atmosphere)
(e) Energy of cladding pulse=50 mJ (Lidar equation)

This system gives only PF=10% at 30 km on a first shot basis. However, no known aircraft flying at 10 km can expose a human eye as its first beam contact. At least 1 m of aircraft has entered the beam before human exposure is possible.

The PF over four shots (1 m penetration) is $10^{-6}$ (as the aircraft enters the cladding beam the PF on each shot falls), which when coupled with the low probability of incidence (ie: beam intersecting aircraft) gives reasonable safety limits.

EXAMPLE 3

Pulsed Laser

Pulsed lasers are much simpler and easier to protect. The cladding requirement becomes simply one of firing the cladding pulse prior to the core pulse, such that no object of concern (usually a human or a vehicle carrying humans) can penetrate the core beam without being detected by the cladding pulse.

In this case, it is not even necessary to spatially separate the two beams, except that it is preferable to have the cladding beam diameter greater than the core beam diameter.

(a) Aircraft speed=250 m/s
(b) Core laser frequency=100 Hz
(c) Cladding laser frequency=100 Hz (same as b)
(d) Length of link=30 km
(e) Laser timing difference=200 $\mu$s (2 way range)
(f) Required cladding thickness=5 cm (axe)
(g) Energy of cladding pulse=50 mJ The PF of this sample system is 10% ($10^{-1}$) per shot at 30 km. If the cladding thickness is increased to 20 cm, and the energy to 100 mJ, the PF falls to $3.6 \times 10^{-7}$ at maximum range.

Throughout this specification, unless the context requires otherwise, the word "comprise", or variations such as "comprises" or "comprising", will be understood to imply the inclusion of a stated integer or group of integers but not the exclusion of any other integer or group of integers.

The described arrangement has been advanced merely by way of explanation and many modifications may be made thereto without departing from the spirit and scope of the invention which includes every novel feature and combination of novel features herein disclosed.

What is claimed is:

1. An apparatus for transmitting a hazardous laser beam, comprising:

means to generate a hazardous laser beam and an eyesafe laser beam;

means to direct each of said beams along respective paths which are substantially parallel and at least partially co-incident so that an object will traverse the path of the eyesafe beam immediately before it is impinged by the hazardous beam; and means to detect reflection of the eyesafe beam by an object and disable transmission of said hazardous beam in response to a predetermined reflection of said eyesafe beam.

2. An apparatus as claimed in claim 1, wherein the path of said eyesafe beam includes a segment which in cross-section is adjacent to the path of said hazardous beam.

3. An apparatus as claimed in claim 2, wherein said segment at least partially surrounds the path of said hazardous beam.

4. An apparatus as claimed in claim 2, wherein said segment wholly surrounds and thereby clads the path of said hazardous beam.

5. An apparatus as claimed in claim 1, wherein said hazardous beam is pulsed, said reflection of said eyesafe beam is detected between said pulses and in the path of the hazardous beam.

6. An apparatus as claimed in any one of claim 1, wherein said hazardous beam is a pulsed laser beam.

7. An apparatus as claimed in any one of claim 1, wherein said eyesafe beam is a pulsed laser beam.

8. An apparatus as claimed in any one of claim 1, wherein said hazardous beam and said eyesafe beam are generated by separate laser emitting sources.

9. An apparatus as claimed in any one of claim 1, wherein said hazardous beam and said eyesafe beam are generated by the same laser emitting source and said eyesafe beam is generated from a portion of said hazardous beam.

10. A method of transmitting a hazardous beam comprising:

generating a hazardous laser beam and an eyesafe laser beam;

directing said beams along respective predetermined paths which are substantially parallel and at least partially co-incident so that an object will traverse the path of the eyesafe beam immediately before it is impinged by the hazardous beam; and detecting reflection of the eyesafe beam by an object, and in response to a predetermined disturbance of the eyesafe beam disabling transmission of said hazardous beam.

11. A method as claimed in claim 10, wherein the path of said eyesafe beam includes a segment which in cross-section is adjacent the path of said hazardous beam.

12. A method as claimed in claim 11, wherein said segment at least partially surrounds the path of said hazardous beam.

13. A method as claimed in claim 11, wherein said segment wholly surrounds and thereby clads the path of said hazardous beam.

14. A method as claimed in claim 10, wherein said hazardous beam is pulsed, said reflection of said eyesafe beam is detected between said pulses and in the path of the hazardous beam.

15. A method as claimed in any one of claim 10, wherein said hazardous beam is a pulsed laser beam.

16. A method as claimed in any one of claim 10, wherein said eyesafe beam is a pulsed laser beam.

17. A method as claimed in claim, wherein said hazardous beam and said eyesafe beam are generated by separate laser emitting sources.

18. A method as claimed in claim 10, wherein said hazardous beam and said eyesafe beam are generated by the laser emitting source and said eyesafe beam is generated from a portion of said hazardous beam.

19. An apparatus for transmitting a hazardous beam comprising:

means to generate a hazardous laser beam and an eyesafe laser beam;

means to direct each of said beams along respective paths which are substantially parallel and in close proximity so that an object will traverse the path of the eyesafe beam before it is impinged by the hazardous beam; and means to detect reflection of the eyesafe beam by an object and disable transmission of said hazardous beam in response to a predetermined reflection of said eyesafe beam.

20. An apparatus as claimed in claim 19, wherein said hazardous beam is a pulsed laser beam.

21. An apparatus as claimed in claim 19, wherein said eyesafe beam is a pulsed laser beam.

22. An apparatus as claimed in claim 19, wherein said hazardous beam and said eyesafe beam are generated by separate laser emitting sources.

23. An apparatus as claimed in claims 19, wherein said hazardous beam and said eyesafe beam are generated by the same laser emitting source and said eyesafe beam is generated from a portion of said hazardous beam.

24. A method of transmitting a hazardous beam comprising:

generating a hazardous laser beam and an eyesafe laser beam;

directing said beams along respective predetermined paths which are substantially parallel and in close proximity so that an object will traverse the path of the eyesafe beam before it is impinged by the hazardous beam; and detecting reflection of the eyesafe beam by an object, and in response to a predetermined disturbance of the eyesafe beam disabling transmission of said hazardous beam.

25. A method as claimed in claim 24, wherein said hazardous beam is a pulsed laser beam.

26. A method as claimed in claim 24, wherein said eyesafe beam is a pulsed laser beam.

27. A method as claimed in claim 24, wherein said hazardous beam and said eyesafe beam are generated by separate laser emitting sources.

28. A method as claimed in claim 24, wherein said hazardous beam and said eyesafe beam are generated by the laser emitting source and said eyesafe beam is generated from a portion of said hazardous beam.

* * * * *